(12) United States Patent
Harris

(10) Patent No.: US 8,430,093 B1
(45) Date of Patent: Apr. 30, 2013

(54) SOLAR COLLECTOR USING SUBREFLECTOR

(75) Inventor: Daniel W. Harris, Mount Laurel, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 773 days.

(21) Appl. No.: 12/472,577

(22) Filed: May 27, 2009

(51) Int. Cl.
*F24J 2/18* (2006.01)

(52) U.S. Cl.
USPC ........... 126/685; 126/683; 126/694; 136/246; 136/248

(58) Field of Classification Search .................. 126/681, 126/683, 685, 694; 136/246, 248
See application file for complete search history.

(56) References Cited

U.S. PATENT DOCUMENTS

| | | | | |
|---|---|---|---|---|
| 3,988,166 A * | 10/1976 | Beam | 136/246 |
| 4,000,733 A * | 1/1977 | Pauly | 126/680 |
| 4,021,267 A * | 5/1977 | Dettling | 136/246 |
| 4,038,972 A * | 8/1977 | Orrison | 126/578 |
| 4,045,246 A * | 8/1977 | Mlavsky et al. | 136/246 |
| 4,068,474 A * | 1/1978 | Dimitroff | 60/641.15 |
| 4,069,812 A * | 1/1978 | O'Neill | 136/246 |
| 4,116,223 A * | 9/1978 | Vasilantone | 126/643 |
| 4,131,485 A * | 12/1978 | Meinel et al. | 136/259 |
| 4,194,949 A * | 3/1980 | Stark | 202/180 |
| 4,198,953 A * | 4/1980 | Power | 126/617 |
| 4,239,034 A * | 12/1980 | Niedermeyer | 126/662 |
| 4,249,516 A * | 2/1981 | Stark | 126/601 |
| 4,313,024 A * | 1/1982 | Horne | 136/253 |
| 4,323,052 A * | 4/1982 | Stark | 126/571 |
| 4,402,306 A * | 9/1983 | McElroy, Jr. | 126/619 |
| 4,687,880 A * | 8/1987 | Morris | 136/246 |
| 5,058,565 A * | 10/1991 | Gee et al. | 126/570 |
| 5,401,329 A * | 3/1995 | Fraas et al. | 136/253 |
| 6,050,526 A * | 4/2000 | Stribling, Jr. | 244/172.8 |
| 6,057,504 A * | 5/2000 | Izumi | 136/246 |
| 6,164,786 A * | 12/2000 | Lloyd | 359/851 |
| 6,498,290 B1* | 12/2002 | Lawheed | 136/246 |
| 6,668,820 B2* | 12/2003 | Cohen et al. | 126/685 |
| 6,691,701 B1* | 2/2004 | Roth | 126/685 |
| 7,339,739 B1* | 3/2008 | Kinney et al. | 359/591 |
| 7,797,939 B2* | 9/2010 | Green | 60/641.15 |
| 8,013,238 B2* | 9/2011 | Hockaday | 136/250 |
| 2002/0179138 A1* | 12/2002 | Lawheed | 136/246 |
| 2003/0037814 A1* | 2/2003 | Cohen et al. | 136/246 |
| 2003/0051750 A1* | 3/2003 | Lawheed | 136/246 |
| 2003/0201008 A1* | 10/2003 | Lawheed | 136/246 |
| 2004/0140000 A1* | 7/2004 | Cohen et al. | 136/246 |
| 2004/0216734 A1* | 11/2004 | Lawheed | 126/573 |
| 2009/0194657 A1* | 8/2009 | Vazquez Ingelmo et al. | 248/309.1 |
| 2009/0205700 A1* | 8/2009 | Horne et al. | 136/246 |
| 2009/0225426 A1* | 9/2009 | Horne et al. | 359/585 |
| 2009/0254228 A1* | 10/2009 | Horne et al. | 700/302 |

(Continued)

*Primary Examiner* — Kenneth Rinehart
*Assistant Examiner* — Jorge Pereiro
(74) *Attorney, Agent, or Firm* — Howard IP Law Group, PC

(57) ABSTRACT

A solar collector includes a collecting mirror defining a radiation-transparent window. A collimating mirror re-reflects the collected radiation through the window to a black-body absorber located behind the collecting mirror. A working fluid flows through the black-body absorber to absorb the resulting power and to transfer the power to a utilization apparatus. The collecting and collimating mirrors may be elongated (cylindrical), or they may be axially symmetric. The working fluid may flow through a separate tube, or simply be contained by an aperture in a block of insulation.

24 Claims, 7 Drawing Sheets

U.S. PATENT DOCUMENTS

2009/0266404 A1* 10/2009 Horne et al. .................. 136/246
2009/0283144 A1* 11/2009 Hebrink et al. ............... 136/259
2010/0043779 A1*  2/2010 Ingram ......................... 126/694
2010/0051021 A1*  3/2010 Kunz ............................ 126/694
2010/0213704 A1*  8/2010 Burger et al. ................. 285/223
2011/0073104 A1*  3/2011 Dopp et al. ................... 126/651

* cited by examiner

US 8,430,093 B1

SOLAR COLLECTOR USING SUBREFLECTOR

BACKGROUND OF THE INVENTION

Well-known solar collectors use parabolic or almost-parabolic mirrors to focus solar radiation energy (or power, which is the time rate of energy) onto one or more collecting tubes which contain an energy-transferring working or heat-transfer fluid. The collecting tubes are often of a metal, such as steel. The tube is assembled in the interior of a glass tube. The glass tube is evacuated to thereby prevent convection heat transfer from the steel collecting tube to the outside world through the glass tube.

SUMMARY OF THE INVENTION

A solar power collector according to an aspect of the invention is for transducing solar power to a working fluid. The solar power collector comprises a cylindrical collecting mirror defining a plane of symmetry in which the cylindrical axis lies, and also defining a solar power collecting region lying on the plane of symmetry when the collecting mirror is directed toward the Sun. The collecting mirror also defines a window centered on the plane of symmetry, and the window has a given dimension perpendicular to the plane of symmetry. The solar collector also comprises a cylindrical collimating mirror defining a plane of symmetry. The collimating mirror has a dimension perpendicular to the plane of symmetry which is substantially equal to the given dimension. A mounting arrangement is coupled to the collecting and collimating mirrors, for mounting the planes of symmetry of the collecting and collimating mirrors in coincidence, with the collimating mirror located at the power collection region, oriented to redirect collected power toward the window, and eclipsing the window when the solar power collector is oriented with the coincident planes of symmetry including the Sun. An elongated or line black-body absorber is mounted adjacent that side of the window which is remote from the collimating mirror, for absorbing solar radiation flowing through the window from the collimating mirror, and for transferring power of the solar radiation to the working fluid. In a particular embodiment of the solar power collector, the window is transparent to infrared radiation as well as to visible radiation. Ideally, the cylindrical collecting mirror has a parabolic cross-section in a plane perpendicular to the coincident planes of symmetry.

In another embodiment, the mounting arrangement comprises an elongated block of insulating material in contact with at least a portion of the rear of the collecting mirror. The block further defines an elongated aperture lying on the conjoined planes and is dimensioned to accommodate the elongated black-body line absorber. The block may also define an elongated slot communicating the elongated aperture with that side of the window remote from the collimating mirror.

In a particularly advantageous embodiment according to an aspect of the invention, the elongated black-body line absorber comprises a hollow tube extending through at least a portion of the elongated aperture parallel to the cylindrical axis of the collecting mirror, the hollow tube containing the working fluid.

DESCRIPTION OF THE INVENTION

A substantial portion of the cost of prior-art solar energy collectors is attributable to the vacuum sealed glass and steel tubes, and the complexity of fabricating the requisite glass-to-metal seals. The glass-to-metal seals are typically accomplished by the use of metal bellows, which allow for differential expansion of the steel and glass portions of the structure as temperatures vary. The ability of the bellows to accommodate longitudinal expansion and contraction, in turn, imposes limits the lengths of the solar collector segments which can be concatenated, which in turn also exacerbates the cost.

In addition, if the insulating vacuum fails, the efficiency of the solar collector can undesirably decrease, and the interior of the sealed region can be exposed to potentially corrosive atmospheric gases. The requirement for generating and maintaining a vacuum increases the need for on-site testing and maintenance, which increases the cost of operating such a solar collection system.

Figure 1A:
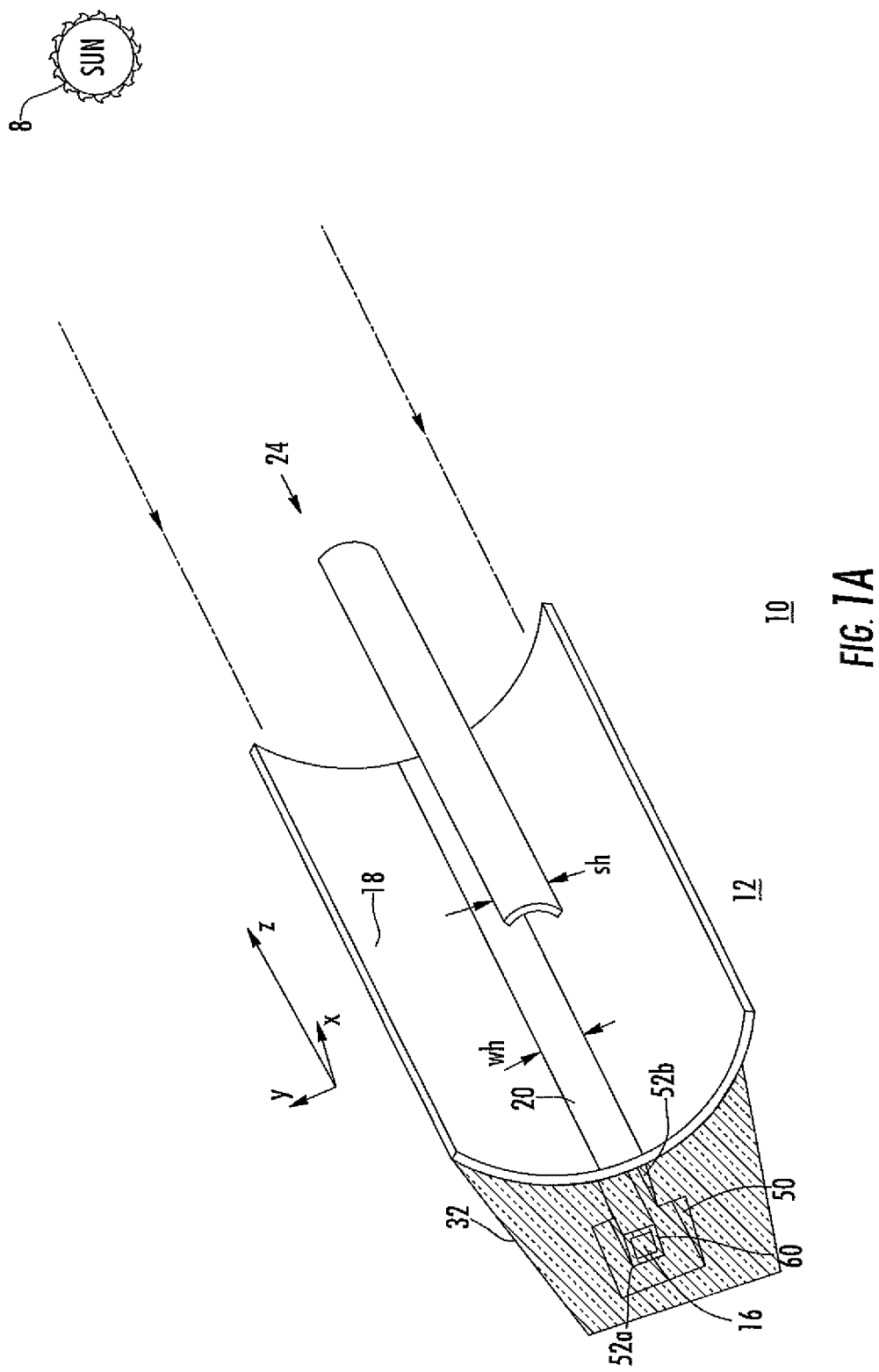
FIG. 1A is a simplified perspective or isometric conceptual view, partially cut away to reveal interior details, of a solar power collector according to an aspect of the invention, showing the general orientation of the collector relative to the Sun, and also showing a main collecting mirror or reflector which is parabolic in one cross-sectional plane and cylindrical in a direction orthogonal to the plane.
Figure 1B:
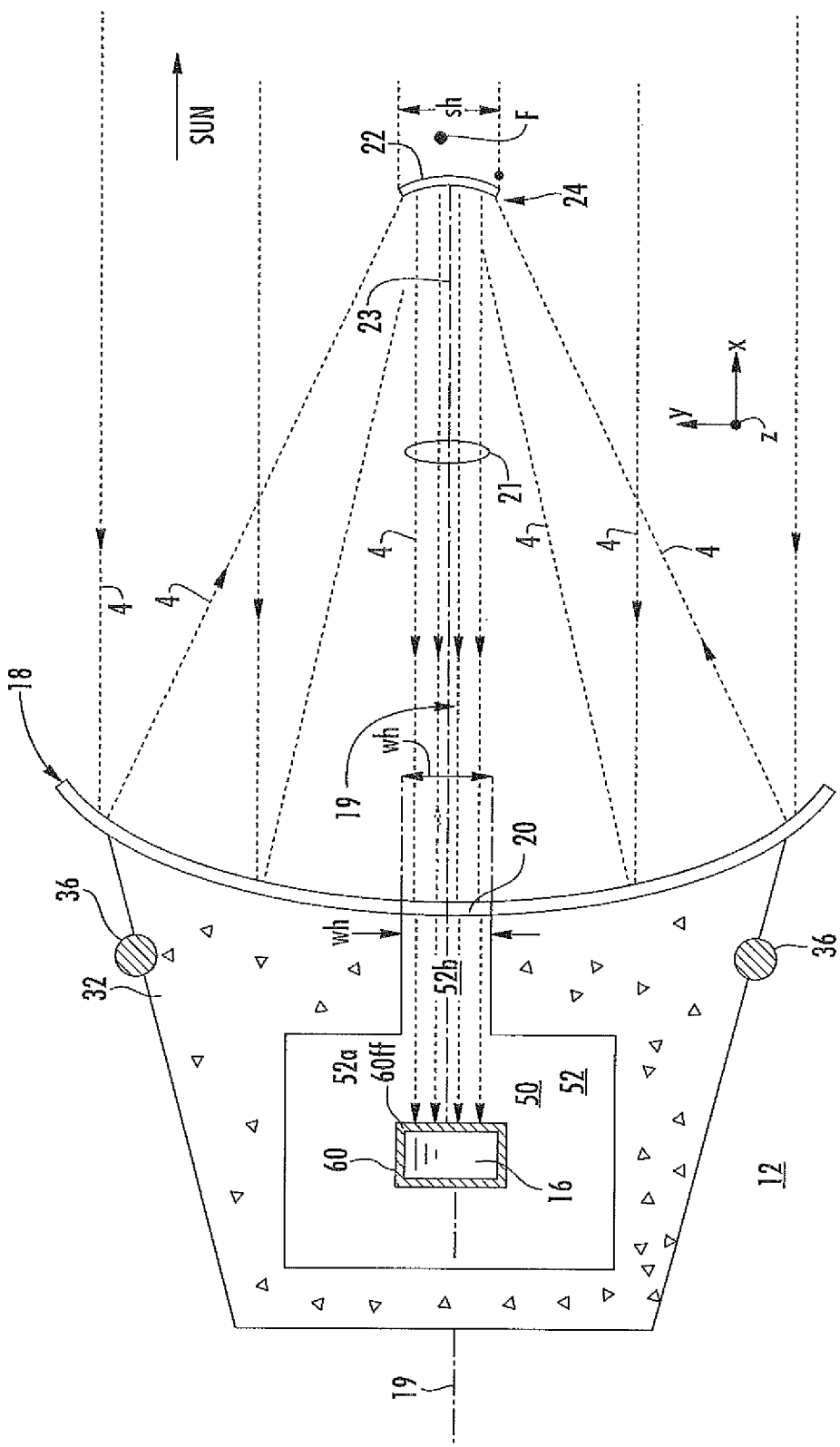
FIG. 1B is a simplified cross-sectional view of the structure of FIG. 1A, illustrating mounting details of the solar power collector of FIG. 1A at a location between support elements.
Figure 1C:
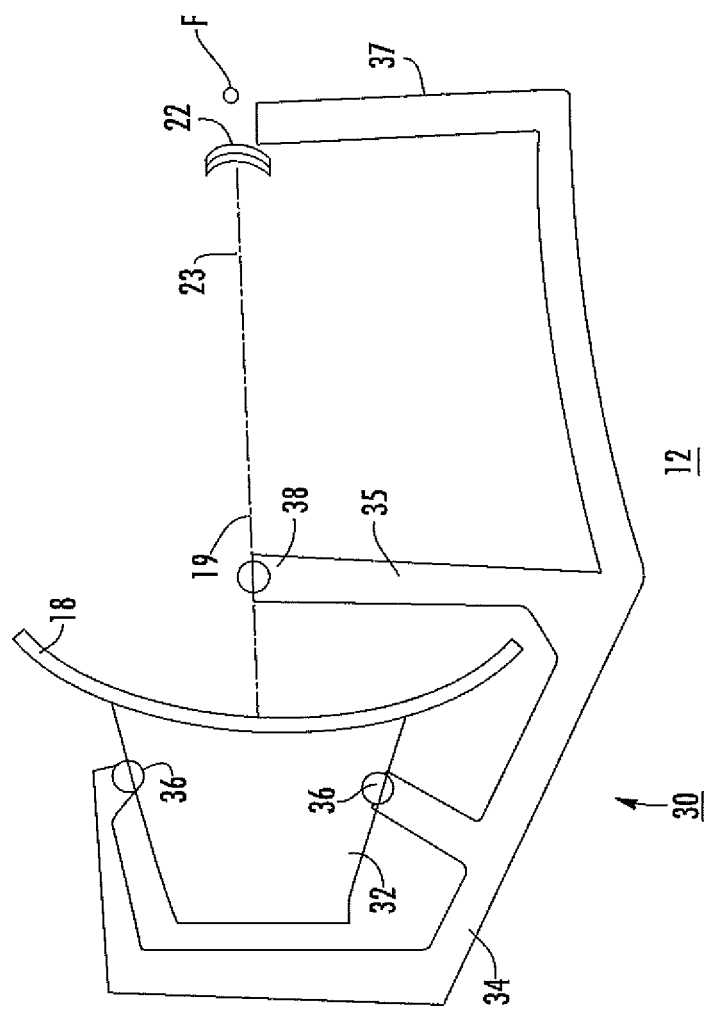
FIG. 1C illustrates additional details of the mounting at the locations of support elements.

In FIGS. 1A, 1B, and 1C, a system 10 includes a solar power collector 12 for capturing radiated energy (power) in the form of optical and infrared radiation from the Sun 8. The solar collector 12 includes a main or collector mirror 18. Mirror 18 is parabolic in the x-y plane, and cylindrical (elongated) in the direction z, which direction z is orthogonal to the x-y plane. Thus, collecting mirror 18 defines a line focus, illustrated as F, lying on a plane of symmetry 19 of collecting mirror 18. Plane of symmetry 19 lies parallel to the x-z plane. Collecting mirror 18 also defines a transparent window 20 which is elongated in the z direction, and which is centered on plane of symmetry 19. Window 20 has a height, designated wh, measured in the y direction or perpendicular to the plane 19 of symmetry of collecting mirror 18. Collection mirror 18 focuses the sun's rays toward focal line F, which is elongated in the z direction.

A sub or collimating reflector 24 defines a collimating surface in an x-y plane and is cylindrical (extends with the same cross-section in the z direction). The collimating surface of subreflector 24 defines a plane of symmetry 23 lying parallel to the x-z plane. The x-z plane of symmetry 19 of the collecting reflector 18 and the x-z plane of symmetry 23 of the subreflector 24 are made to be coincident. The y-direction dimension of subreflector 24 is designated sh, and is made equal to the y-direction dimension wh of window 20. With the subreflector 24 mounted slightly closer to the collecting reflector 18 than the focal point F of the collecting reflector 18, the collimating reflector 24 intercepts all of the solar radiation reflected by collecting reflector 18. Solar radiation is illustrated in FIG. 1B as dash lines, some of which are designated 4. Placing the subreflector in this manner allows the solar radiation reflected by the collecting reflector 18 to be intercepted by the subreflector 24 and reflected as a collimated beam "back" toward the window 20 in the collecting reflector 18. The term "collimated" in this context means that the rays of the solar energy beam are essentially parallel. The collimated beam of collected light is designated 21 in FIG. 1B.

When the superposed or conjoined planes of symmetry 19 and 23 of the collecting reflector 18 and of the subreflector 14, respectively, lie on or intercept the Sun, the collimated beam of solar radiation produced by subreflector 24 flows through window 20 into a black-body absorber designated 50. Those skilled in the art know that a black-body absorber ideally absorbs electromagnetic radiation (light, for example) of all wavelengths. It does this by ideally converting to heat all incident radiation, reflecting or re-radiating no radiation. These ideal conditions can only be approximated in real-world structures.

Figure 3A:
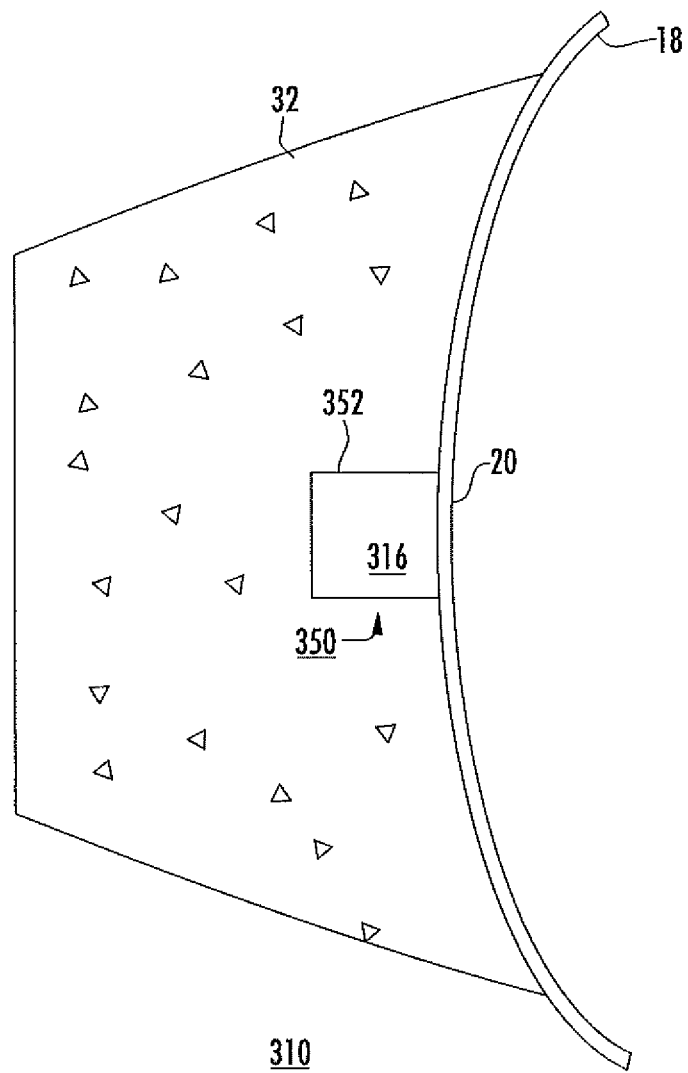
FIG. 3A is a simplified diagram generally similar to FIG. 1b, in which the aperture acts as the tube for containing the working fluid.
Figure 3B:
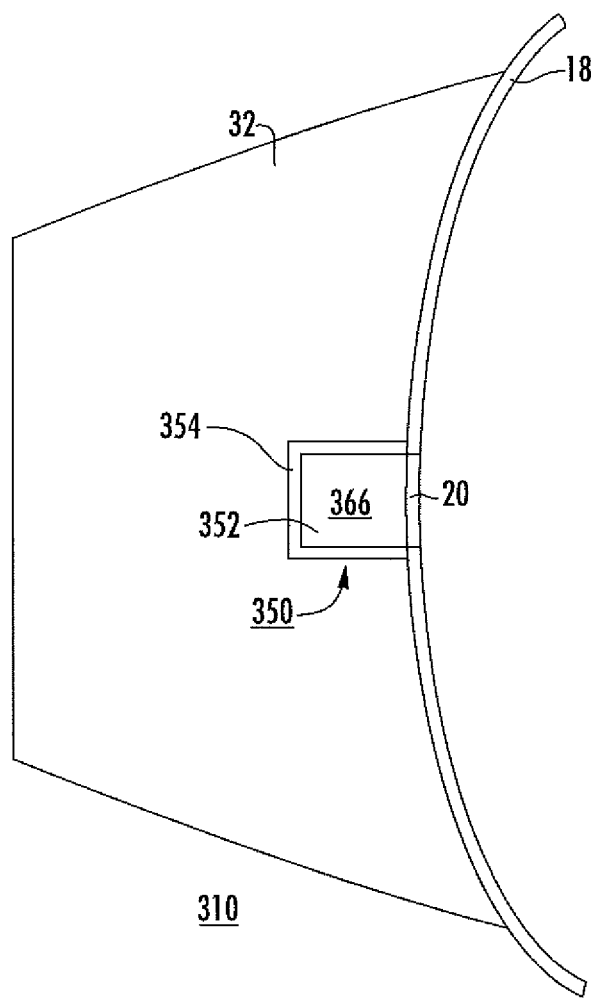
FIG. 3B illustrates a layer of sealant on the surface of the aperture.

As illustrated in FIG. 3B, a block or structure of insulating material 32 is affixed to the rear of collecting mirror 18. This block or structure may be a portion of the mirror mounting, if desired. Black-body absorber 50 includes an aperture 52 in the insulating material 32, which aperture 52 includes a "rectangular" portion 52a and a "slot" portion 52b. Aperture 52 is elongated in the z direction. Window 20 opens into slot portion 52b of black-body absorber 50. The aperture 52a as illustrated in the cross-section of FIG. 3B has a rectangular shape, and communicates with window 20 by way of a slot portion 52b of the black-body absorber 50. In operation of the solar collector 12, the collecting mirror 18 is directed toward the Sun 8, and collects and reflects solar power toward line focus F. Collimating mirror 22 intercepts the solar power, and reflects it as a collimated beam of light toward and through window 20. The solar power entering the aperture 52 is principally absorbed, thereby heating the black-body absorber 50.

In a particular embodiment of an aspect of the invention, the insulating block may be made of a foam material.

A tube 60 extends in the z direction through aperture 52 in the block 32 of insulation in FIGS. 1a and 1B. Tube 60 carries the working fluid 16 which transfers the collected solar power to a utilization apparatus. In general, the mechanism by which the working fluid is heated is by direct impingement of the solar rays onto that portion of tube 60 facing window 20, and by re-radiation onto the tube 60 from the hot interior of the aperture 52. The working fluid may simply be heated by the collected solar energy, and used for heating of a building, swimming pool, or the like, as known in the art. Alternatively, the working fluid may be vaporized by the solar power, to thereby produce compressed fluid that can be used to rotate a machine, as for generation of electricity, also as known in the art.

The outer surface of tube 60 may be treated to reduce reflections, as for example by black anodizing if the tube is aluminum.

As illustrated in FIG. 1B, the tube 60 may have a rectangular cross-section, with a flat face 60ff onto which the rays may be normally incident. Normal incidence will tend to reduce reflection of those rays which fall directly onto the tube 60, and so will tend to enhance efficiency. Also in FIG. 1B, longitudinal (z-direction) support structures affixed to the insulating block 32 are illustrated as circles 36. These longitudinal supports are in turn supported at spaced-apart locations by additional support structures 30, illustrated in FIG. 1C.

FIG. 1C is a cross-section at a support location that details mechanical support 30 for the collecting mirror 18, the subreflector 22, and the insulating block 32. The main portion of support structure 30 lies at specific locations along the z direction. This support structure 30 includes a portion 34 extending to, and affixed, to insulating block 32 by means of support bars 36 extending longitudinally (in the z direction) through portions of the insulating block 32. Support structure 30 also includes a portion 35 which extends to a location 38. Location 38 is a location about which the entire solar collector structure 12 can be rotated. Thus, location 38 may be viewed as being a trunnion or axle. The location of axis of rotation 38 can be selected to accommodate mechanical constraints particular to the site. Support structure 30 further includes a portion 37 which extends to support subreflector 22.

According to an aspect of the invention, the cavity defined by aperture 52 may be evacuated or filled with substantially inert gas such as nitrogen. The use of nitrogen at atmospheric pressure reduces the forces tending to cause leaks, and even in the presence of a leak, such a leak will occur slowly so that the inert nature of the internal atmosphere will be maintained for some period of time.

Figure 2:
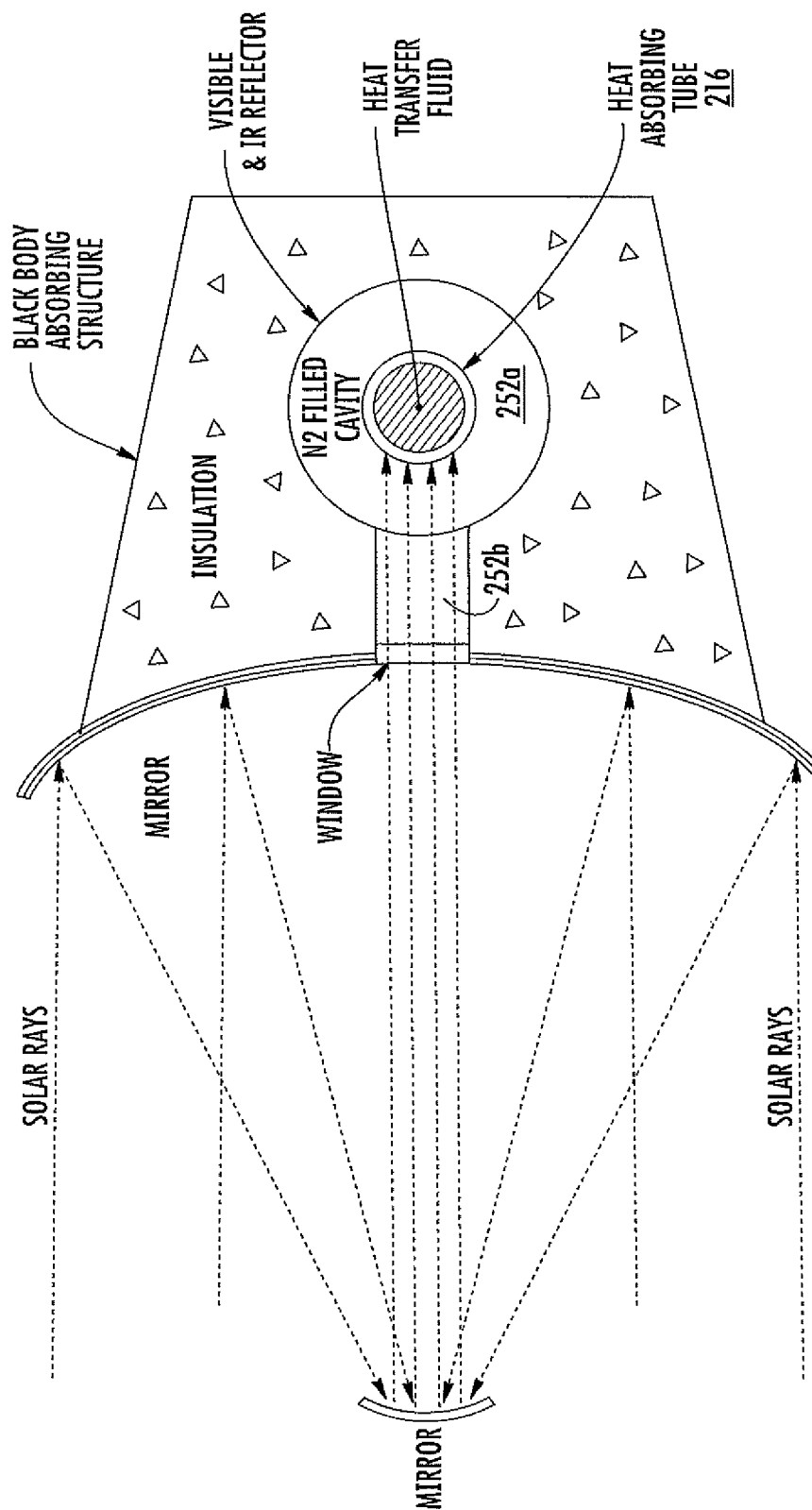
FIG. 2 is a simplified diagram similar to FIG. 1B, in which the shape of certain apertures is circular rather than rectangular.

FIG. 2 illustrates a simplified solar collector generally similar to that of FIG. 1B, with the differences lying in the round cross-sectional shape of the aperture, designated 252a, and of the tube, designated 216.

Both the arrangements of FIGS. 1A, 1B, 1C, and 2 have the advantages of requiring no vacuum, and therefore no glass-to-metal seals and no bellows.

Consequently, the length (in the z direction) of solar collector segments according to aspects of the invention is not limited by the amount of length accommodation provided by practical bellows. The use of longer sections avoids the inefficiencies attributable to the less efficient solar collection at the bellows or joint locations.

FIG. 3A illustrates a portion 310 of a solar collector including a collecting mirror 18 defining a window 20. Window 20 opens into a cavity 352 in a block 32 of insulating material. The working fluid 316 is contained by the aperture or cavity 362. In one version, the insulating material 32 is hydrophobic and the working fluid is water or at least aqueous, so the working fluid does not tend to wet the insulation, and therefore does not tend to penetrate the insulation 32. Thus, no separate tube is needed to contain the working fluid 316. This has the advantage that the temperature difference between the absorber and the working fluid can be small, which tends to increase the efficiency, as the heat tends to flow to the working fluid 316 rather than to the insulation 32. In another embodiment illustrated in FIG. 3B, a layer of sealant, illustrated as 354, seals the interior surface of the aperture 352 against ingress by the working fluid.

Figure 4:
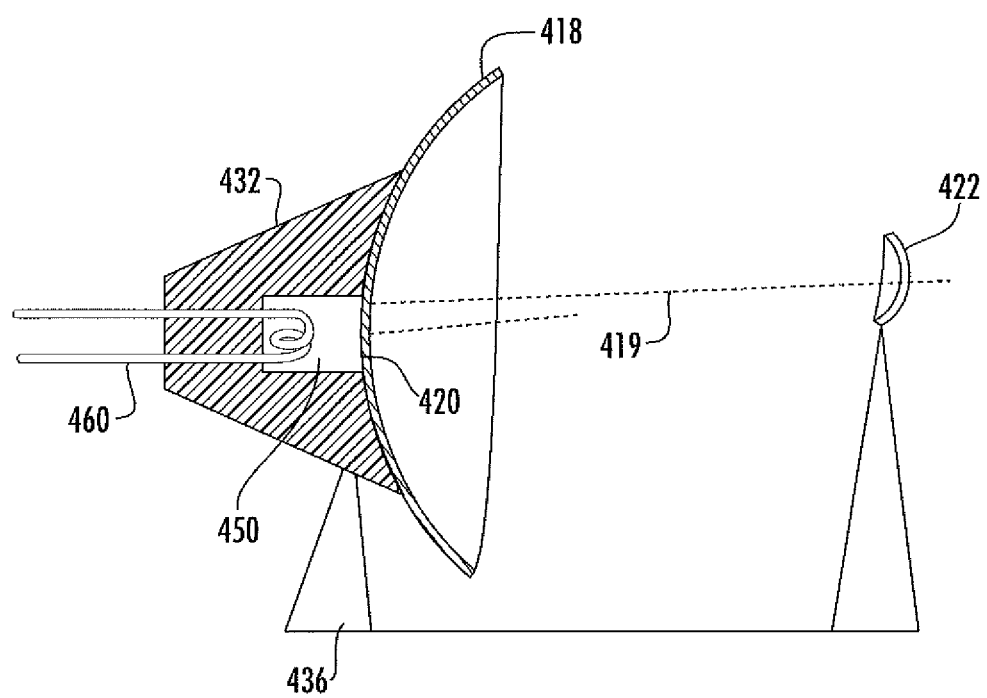
FIG. 4 illustrates a solar power converter including axially symmetric collection and collimating mirrors, and axially symmetric window opening into an aperture for heating working fluid.

FIG. 4 illustrates an axially symmetric solar power collector according to an aspect of the invention. In FIG. 4, a Cassegranian-type solar collector arrangement includes a parabolic collection mirror 418 circularly symmetrical about an axis 419. Mirror 418 collects radiation and directs it toward a subreflector 422m. Subreflector 422m is also circularly symmetric about axis 419, and is mounted with its line of symmetry lying on the axis of symmetry of collecting mirror 418 by means of a mounting represented as 436. Subreflector 422 redirects the collected solar radiation toward and through a window 420 lying on axis 419. The solar energy entering window 420 heats a black-body absorber 450. The black-body absorber 450 is in the form of a cavity 452 in a thermal insulation block 432. A pipe 460 carrying working fluid transfers heat from the absorber 450 to a utilization apparatus, not illustrated.

A solar power collector (12) according to an aspect of the invention is for transducing solar power to a working fluid (16). The solar power collector (12) comprises a cylindrical collecting mirror (18) defining a plane of symmetry (19) in which the cylindrical axis lies, and also defining a solar power collecting region (24) lying on the plane of symmetry (19) when the collecting mirror is directed toward the Sun (8). The collecting mirror (18) also defines a window (20) centered on the plane of symmetry (19), and the window (20) has a given dimension (wh) perpendicular to the plane of symmetry (19). The solar collector (12) also comprises a cylindrical collimating mirror (24) defining a plane of symmetry (23). The collimating mirror (24) has a dimension (sh) perpendicular to the plane of symmetry (23) which is substantially equal to the given dimension (wh). A mounting arrangement (30) is coupled to the collecting (18) and collimating (22) mirrors, for mounting the planes of symmetry (19,23) in coincidence, with the collimating mirror (22) located at the power collection region (24), oriented to redirect collected power toward the window (20), and eclipsing the window (20) when the collecting mirror (18) is oriented with the coincident planes of symmetry (19,23) including the Sun (8). An elongated black-body line absorber (50) is mounted adjacent that side of the window (20) which is remote from the collimating mirror (22), for absorbing solar radiation (21) flowing through the window (20) from the collimating mirror (22), and for transferring power of the solar radiation to the working fluid (16). In a particular embodiment of the solar power collector (12), the window (20) is transparent to infrared radiation. Ideally, the cylindrical collecting mirror (18) has a parabolic cross-section in a plane perpendicular to the coincident planes of symmetry (19,23).

In another embodiment, the mounting arrangement (30) comprises an elongated block (32) of insulating material in contact with at least a portion of the rear of the collecting mirror (18). The block (32) further defines an elongated aperture (52) lying on the conjoined planes (19,23) and is dimensioned to accommodate the elongated black-body line absorber (50). The block (32) may also define an elongated slot (54) communicating the elongated aperture (52) with that side of the window (20) remote from the collimating mirror (22).

In a particularly advantageous embodiment according to an aspect of the invention, the elongated black-body line absorber (50) comprises a hollow tube (60) extending through at least a portion of the elongated aperture (52) parallel to the cylindrical axis of the collecting mirror, the hollow tube (60) containing the working fluid.

What is claimed is:

1. A solar power collector for transferring solar energy to a working fluid, said solar power collector comprising:
   a collecting reflector having a line of symmetry, said collecting reflector having a window centered on said line of symmetry;
   a collimating reflector defining a line of symmetry;
   wherein said lines of symmetry are coincident such that said collimating reflector is oriented to direct solar radiation toward said window; and
   an absorber mounted adjacent said window for absorbing solar radiation directed through said window from said collimating reflector, and for transferring energy of said solar radiation to a working fluid disposed in a cavity defined in said absorber,
   wherein said absorber is arranged in a block of insulating material having a first side, at least a portion of the first side abutting a rear surface of said collecting reflector.

2. A collector according to claim 1, wherein said collecting reflector and said collimating reflector each has a parabolic cross-section.

3. A collector according to claim 1, wherein said cavity comprises a hollow tube containing said working fluid.

4. A solar collector according to claim 1, wherein said window is transparent to infrared radiation.

5. A solar collector according to claim 1, wherein the collimating reflector is located closer to the collecting reflector than a focal point of the collecting reflector such that the collimating reflector intercepts all of the solar radiation reflected by the collecting reflector.

6. A method for transferring solar energy to a working fluid, comprising:
   providing a collecting mirror having a line of symmetry and a window centered on said line of symmetry;
   providing a collimating mirror defining a line of symmetry coincident with the line of symmetry of said collecting mirror;
   directing solar radiation through said window, said solar radiation reflected from said collecting mirror and said collimating mirror;
   absorbing said solar radiation in a working fluid disposed adjacent said collecting mirror, and
   insulating said working fluid within a block of insulating material having a first side, at least a portion of the first side abutting a rear surface of said collecting mirror.

7. A method according to claim 6, wherein said working fluid is disposed in a pipe such that said working fluid is transferrable to a remote location.

8. A method according to claim 6, wherein the step of absorbing said solar radiation comprises vaporizing said working fluid.

9. A solar power collector for transducing solar power to a working fluid, said solar power collector comprising:
   a collecting mirror defining a line of symmetry, and also defining a solar power collecting region lying on said line of symmetry, said collecting mirror also defining a window centered on said line of symmetry, said window having a given dimension perpendicular to said line of symmetry;
   a collimating mirror defining a line of symmetry, said collimating mirror having a dimension perpendicular to said line of symmetry substantially equal to said given dimension;
   a mounting arrangement coupled to said collecting and collimating mirrors, for mounting said lines of symmetry in coincidence, with said collimating mirror located at said power collection region, and oriented to redirect collected power toward said window, and eclipsing said window when said collecting mirror is oriented with said coincident lines of symmetry; and
   a black-body absorber mounted adjacent that side of said window remote from said collimating mirror, for absorbing solar radiation flowing through said window from said collimating mirror, and for transferring energy of said solar radiation to said working fluid,
   wherein said mounting arrangement comprises a block of insulating material in contact with at least a portion of a rear surface of said collecting mirror, said block further defining an aperture dimensioned to accommodate said black-body absorber and communicating said aperture with that side of said window remote from said collimating mirror.

10. A collector according to claim 1, wherein said window is transparent to the infrared region.

11. A collector according to claim 1, wherein said collecting mirror has a parabolic cross-section in a plane parallel to said coincident lines of symmetry.

12. A collector according to claim 1, wherein said black-body absorber comprises a hollow tube extending through at least a portion of said aperture, said hollow tube containing said working fluid.

13. A collector according to claim 1, wherein said aperture contains said working fluid.

14. A solar power collector for transducing solar power to a working fluid, said solar power collector comprising:
  a collecting mirror defining at least an axis of symmetry, and also defining a solar power collecting region lying on said axis of symmetry, said collecting mirror also defining a window centered on said axis of symmetry, said window having a given dimension perpendicular to said line of symmetry;
  a collimating mirror defining an axis of symmetry, said collimating mirror having a dimension perpendicular to said line of symmetry substantially equal to said given dimension;
  a mounting arrangement coupled to said collecting and collimating mirrors, for mounting said axes of symmetry in coincidence, with said collimating mirror located at said power collection region, and oriented to redirect collected power toward said window when said collecting mirror is oriented with said coincident lines of symmetry; and
  a black-body absorber mounted adjacent that side of said window remote from said collimating mirror, for absorbing solar radiation flowing through said window from said collimating mirror, and for transferring energy of said solar radiation to said working fluid,
  wherein said mounting arrangement comprises a block of insulating material having a first side, at least a portion of the first side abutting a rear surface of said collecting mirror, said block further defining an aperture dimensioned to accommodate said black-body absorber and communicating said aperture with that side of said window remote from said collimating mirror.

15. A collector according to claim 14, wherein said portion of said first side of said block of insulating material comprises a complementary profile to said rear surface of said collecting mirror.

16. A collector according to claim 15, wherein said rear surface of said collecting mirror comprises a curved profile, and said portion of said first side of said block of insulating material comprises a complementary curved profile to said rear surface.

17. A collector according to claim 14, wherein said aperture is sized to correspond to that of said window.

18. A solar power collector for transducing solar power to a working fluid, said solar power collector comprising:
  a parabolic collecting mirror defining a line of symmetry, and also defining a solar power collecting region lying on said line of symmetry, said collecting mirror also defining a window centered on said line of symmetry, said window having a given dimension perpendicular to said line of symmetry;
  a collimating mirror defining a line of symmetry, said collimating mirror having a dimension perpendicular to said line of symmetry substantially equal to said given dimension;
  a mounting arrangement coupled to said collecting and collimating mirrors, for mounting said lines of symmetry in coincidence, with said collimating mirror located at said power collection region, and oriented to redirect collected power toward said window, and eclipsing said window when said collecting mirror is oriented with said coincident lines of symmetry; and
  an elongated black-body line absorber mounted adjacent that side of said window remote from said collimating mirror, for absorbing solar radiation flowing through said window from said collimating mirror, and for transferring energy of said solar radiation to said working fluid,
  wherein said mounting arrangement comprises an elongated block of insulating material in contact with at least a portion of a rear surface of said collecting mirror, said block further defining an aperture lying on said conjoined lines of symmetry and dimensioned to accommodate said black-body line absorber and also defining an opening communicating said aperture with that side of said window remote from said collimating mirror.

19. A collector according to claim 18, wherein said window is transparent to the infrared region.

20. A collector according to claim 18, wherein said collecting mirror has parabolic cross-sections in planes parallel to said coincident lines of symmetry.

21. A collector according to claim 18, wherein said black-body absorber comprises a hollow tube extending through at least a portion of said aperture, said hollow tube containing said working fluid.

22. A collector according to claim 18, wherein said aperture contains said working fluid.

23. A collector according to claim 22, wherein said working fluid is water, and said insulation is hydrophobic.

24. A collector according to claim 22, wherein said elongated aperture is coated with sealant.

\* \* \* \* \*